Patented Oct. 13, 1925.

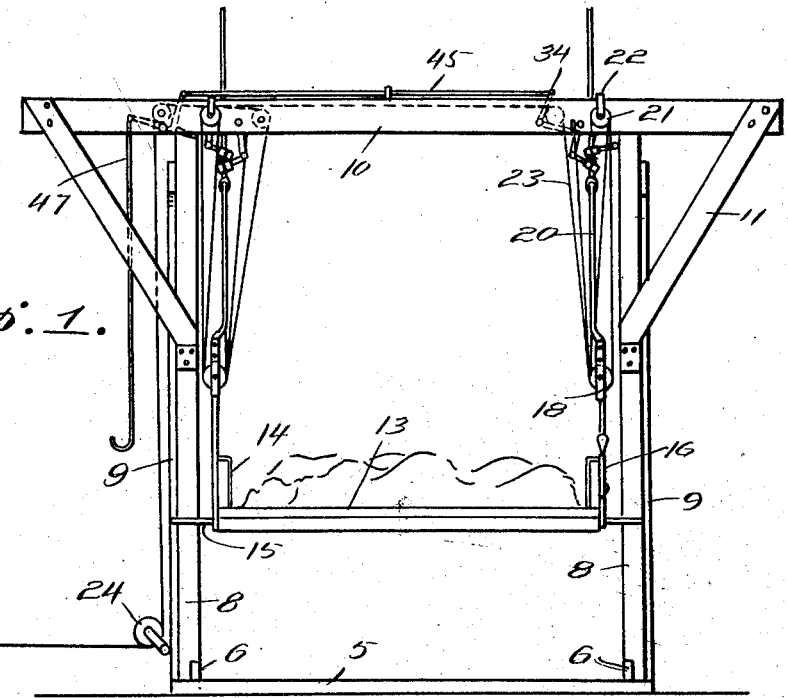
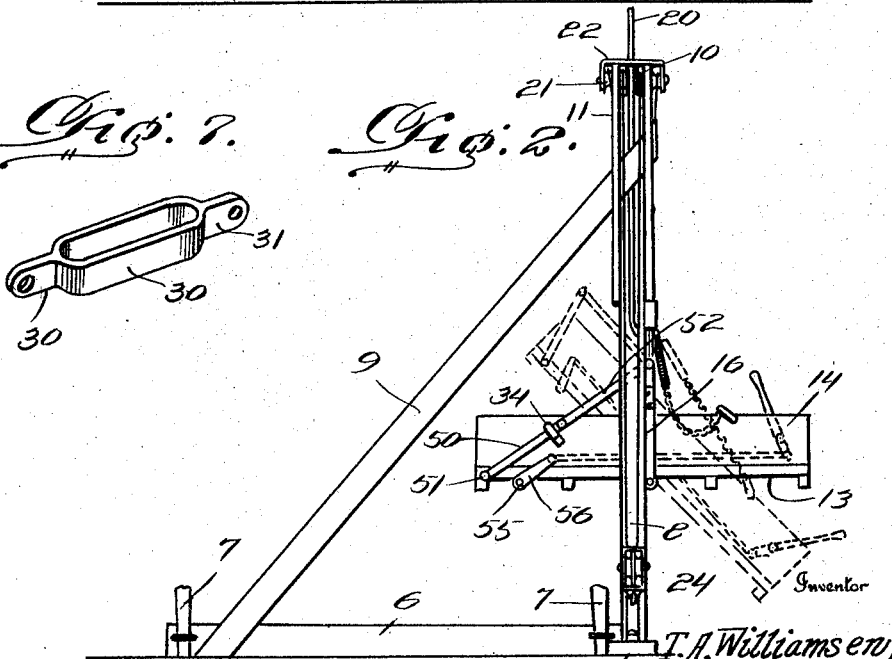

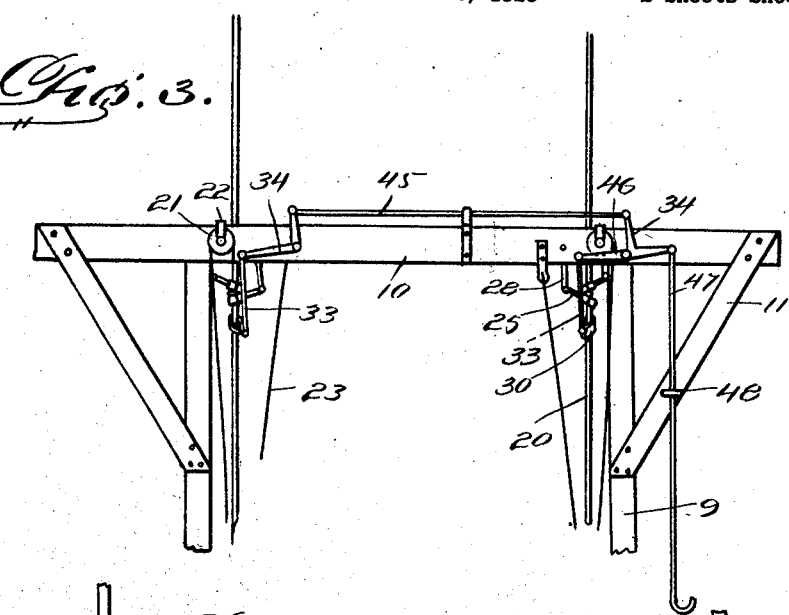
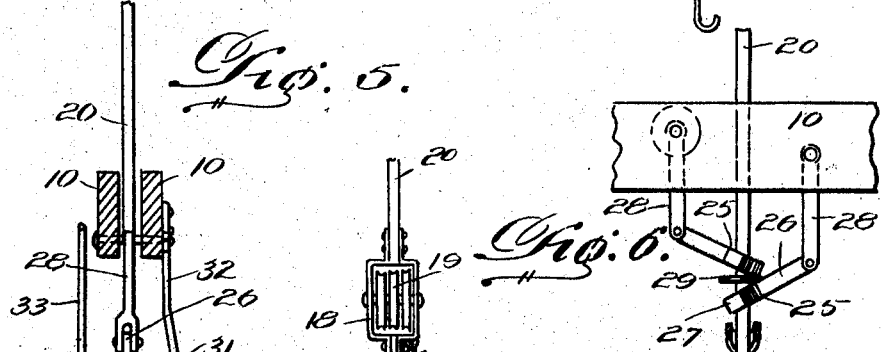
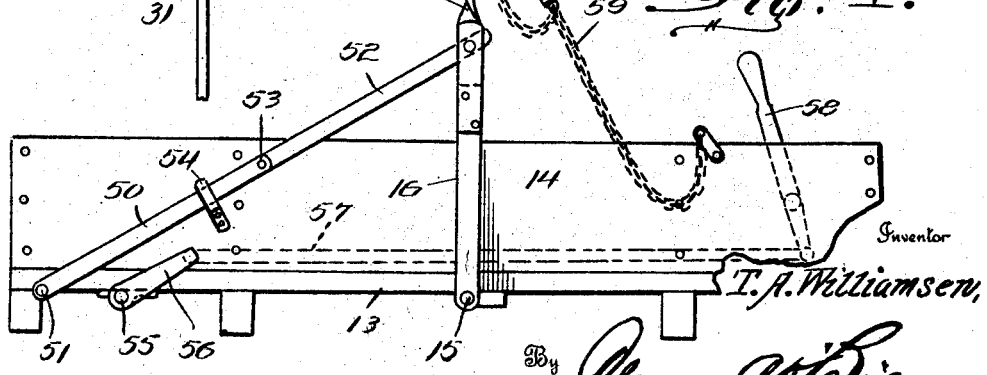

1,557,512

UNITED STATES PATENT OFFICE.

THOMAS A. WILLIAMSEN, OF HAMPTON, NEBRASKA.

MANURE LOADER.

Application filed June 2, 1925. Serial No. 34,412.

*To all whom it may concern:*

Be it known that I, THOMAS A. WILLIAMSEN, a citizen of the United States, residing at Hampton, in the county of Hamilton and State of Nebraska, have invented certain new and useful Improvements in a Manure Loader, of which the following is a specification.

The present invention relates generally to elevating mechanism, and more particularly to a manure loader, and has for its object to provide a structure which may be actuated by draft animals in a convenient and easy manner.

Another important object of the invention is to provide a device of this nature with a load carrying platform that may be readily tilted so that the load thereon may be dumped.

Another important object of the invention is to provide a device of this nature having means for holding the platform in any desired raised position, and also means for releasing the platform in order that it may descend.

A still further important object of the invention is to provide a device of this nature having an exceedingly simple structure, one which is thoroughly reliable and efficient in operation, strong, durable, not likely to easily become out of order, and otherwise well adapted to the purpose for which it is designed.

With the above and numerous other objects in view as will appear as the description proceeds, the invention resides in certain novel details of construction, and in the combination and arrangement of parts as will be hereinafter more fully described and claimed.

In the drawings:—

Figure 1 is an elevation of the loader embodying the features of my invention.

Figure 2 is a side elevation thereof taken at right angles to that shown in Figure 1.

Figure 3 is an elevation of the upper portion of the supporting frame taken to the opposite side from that shown in Figure 1.

Figure 4 is an enlarged detail side elevation of the platform.

Figure 5 is an enlarged detail view showing the rod gripping and releasing means.

Figure 6 is another similar view taken at right angles to that shown in Figure 5, and Figure 7 is a detail perspective view of one of the releasing collars.

Referring to the drawing it will be seen that the loader consists generally of a frame structure, and a load platform structure mounted to ascend and descend in the frame. Referring first particularly to the frame structure it will be seen that the numeral 5 designates a base B, having attached thereto parallel spaced ground bars 6 which extend rectangularly from the ends of the beam and are anchored to the ground by means of stakes 7 or in any other suitable manner. A pair of uprights 8 are mounted perpendicularly on the beam 5, one at each end thereof. Braces 9 extend diagonally of and are attached to the bars 6 and the uprights 8. A pair of spaced parallel top bars 10 are fixed to the upper ends of the uprights 8 and straddle these uprights so as to be in parallelism with the beam 5. The top bars 10 extend beyond the sides of the frame as is clearly shown in Figures 1 and 3, and diagonal braces 11 are fixed to the ends thereof and to the uprights at upper intermediate portions thereof.

Referring now particularly to the load platform, it will be seen that numeral 13 designates the bottom thereof, and 14 the sides thereof. A supporting bar 15 extends transversely across the under surface of the bottom 13, and is fixed thereto. This bar 15 is slightly off center as will be evident from an inspection of Figure 4. As will be seen to advantage in Figure 1, the bar 15 extends beyond the sides of the platform, and are adapted to move along the edges of the uprights whereby said uprights function as guides during the ascending and descending of the platform. Arms 16 are pivoted to the bar 15 adjacent its ends, one to each side of the platform, and are twisted intermediate their ends as at 17. Pulley boxes 18 are attached to the upper ends of the arms 16, and house a plurality of wheels 19. Rods 20 are fixed to the boxes 18 and rise upwardly to extend between the top bars 10 of the frame. Pulleys 21 are mounted in brackets 22 supported on the top bars 10, and a cable 23 is trained over the pulleys 21 and 19 in the well known block and tackle manner so that the cable may be trained over a pulley 24 and draft animals hooked up thereto for pulling the cable so as to ascend the platform.

A pair of grapple members 25 is associated with each rod 20. These grapple members include shanks 26 and substantially square sleeves 27 formed integral therewith. Two links 28 are associated with each pair of grapples 25. These links 28 are pivoted to the ends of the shanks 26 at their lower ends and at their upper ends are pivoted between the top bars 10, one at a slighter higher elevation than the other, so that one sleeve 27 is above the other. A washer 29 is disposed between the sleeves 27, as is shown to advantage in Figure 6. An oblong collar 30 is mounted on each rod 20 below the sleeves 27, and is provided with a pair of oppositely extending ears 31 to one of which is attached a rod 32 fixed to one of the top bars 10 while a link 33 is pivoted to the other ear. A pair of bell cranks 34 are pivoted on the top bar 10 opposite to that to which is attached rods 32. These bell cranks are connected by a rod 45. An arm 46 is provided on one bell crank 34, and this bell crank has a depending rod 47 attached thereto and extending through a guide eye 48 on one of the braces 11 so that both of the bell cranks may be operated together. The arm of the last mentioned bell crank and the free end of the other bell crank are attached to links 33. As the platform is raised the rods 20 move upwardly through the collars 30 and sleeves 27. When the platform stops and the cable 23 becomes slack, the sleeves 27 will be engaged with the rods 20 in a binding manner, thus preventing the descending of the platform. If it is desired that the platform should descend, the actuating rod 47 is pulled downwardly, thus rocking the bell crank lever 34 and pulling upwardly on the links 33 so as to cause the collars 30 to lift upwardly on the sleeves 27, thus releasing them from binding engagement with the rods 20 whereby said rods are free to descend downwardly with the platform.

A toggle arm 50 is pivoted to the platform as at 51 and another toggle arm 52 is pivoted to the arms 16. These toggle arms are pivoted together as at 53, and are normally disposed in alignment with each other, the toggle arm 50 being disposed in a stop 54. If desired, there may be a pair of these toggle arms 50 and 52 to each side of the platform, but a single pair will suffice for the purpose of this description and will function efficiently in actual use. A shaft 55 is journaled on the bottom 13 and has on its end a crank 56 for engagement with the toggle arm 50, and a similar crank on its other end (not shown) pivoted to a rod 57 which is pivotally engaged with one end of a lever 58. By rocking the lever 58 the crank 56 may be forced into engagement with the arm 50 just breaking the alignment of the arms 50 and 52, and causing the tilting of the platform, which when thrown off balance will move to a dumping position as is indicated in dotted lines in Figure 2. A chain 59 is attached to the boxing 18 and to the side 14 of the platform for limiting the tilting movement thereof. A shock absorbing spring 60 is preferably attached to an intermediate portion of the chain 59 and to the boxing 18 so that this spring must be stretched before the chain is taut.

With this device I find it possible to fill a spreader at one dumping and thereby save considerable time and labor.

It is thought that the construction, operation, and advantages of the invention will now be clearly understood without a more detailed description thereof. The present embodiment of the invention has been disclosed merely by way of example and attains all the features of advantage enumerated as desirable in the statement of the invention and the above description. It is apparent that numerous changes in the details of construction, and in the combination and arrangement of parts may be resorted to without departing from the spirit or scope of the invention as hereinafter claimed or sacrificing any of its advantages.

Having thus described the invention, what I claim as new is:—

1. A device of the class described including a frame and a platform, said frame comprising a pair of uprights, a pair of cross bars extending across the tops of the uprights, rods projecting upwardly from the platform between the top bars, grapple members mounted on the top bars for receiving the rods and preventing the descension of the platform, and means for releasing the grapple members from the rods so as to allow the descension of the platform, and means for elevating the platform.

2. A device of the class described including a pair of uprights, a pair of top bars straddling the ends of the uprights and fixed thereto, a platform movable between the uprights, rods extending upwardly from the platform between the top bars, means for elevating the platform, a plurality of grapple members, a pair associated with each rod, each grapple member including a shank, and a sleeve for receiving the respective rods, one sleeve of each pair of grapples being disposed above the other sleeve, a washer between the sleeves, collars on the rod, means for raising the collars for releasing the sleeves from the rods to allow the descension of the platform.

3. A device of the class described including a frame, a platform mounted for ascension and descension in the frame, means for elevating the platform, a pair of rods rising from the platform, a pair of brackets depending from the top frame, one adjacent each rod, a grapple pivoted on each bracket for receiving the respective rod, a collar on each rod, and means for raising the collar so as to lift the grapple out of engagement with the rod for allowing the descension of the platform.

4. A device of the class described including a frame, a platform mounted for ascension and descension in the frame, rods rising from the platform, a grapple mechanism associated with each rod, each mechanism consisting of a pair of grapple members provided with sleeves and shanks, links depending from the top of the frame and pivotally engaged with the shanks of the grapple members, said rods extending through the sleeve of the grapple members, the sleeves receiving each rod being disposed one above the other, a washer between the sleeves, a collar receiving each rod, a bracket depending from the top of the frame for receiving pivotally each collar, a link attached to each collar, a pair of bell cranks on the frame, a connection between the bell cranks for simultaneous operation, means for operating one of the bell cranks, said links being attached to the bell cranks whereby upon operation thereof the collars will be raised upwardly to engage the sleeve and release them from the rods to allow the descension of the platform.

5. A device of the class described including a frame, a platform mounted for ascension and descension in the platform, means for elevating the platform, a pair of rods, means pivoting the rods to the platform, said rods being associated with the frame to be guided by the latter, a pair of toggle arms pivoted together and having their extremities pivoted respectively to one rod and to the platform, said toggle arms being disposed in alignment with each other when the platform is horizontal, a shaft journaled on the platform, cranks at the ends of the shaft, one of said cranks being engageable with one of said toggle arms to break the alignment therebetween and tilt the platform, and means engageable with the other crank arm for rocking the shaft.

6. A device of the class described including a frame, a platform mounted for ascension and descension in the platform, means for elevating the platform, a pair of rods, means pivoting the rods to the platform, said rods being associated with the frame to be guided by the latter, a pair of toggle arms pivoted together and having their extremities pivoted respectively to one rod and to the platform, said toggle arms being disposed in alignment with each other when the platform is horizontal, a shaft journaled on the platform, cranks at the ends of the shaft, one of said cranks being engageable with one of said toggle arms to break the alignment therebetween and tilt the platform, means engageable with the other crank arm for rocking the shaft, a chain attached to the platform and to one of the rods, and a spring attached to an intermediate portion of the chain and to the rod to which the chain is attached and adapted to be tensioned when the chain is taut as the platform is fully tilted.

7. A device of the class described including a frame, a platform movable in the frame, a rod extending from the platform, and slidable through a portion of the frame, a pair of links depending from the top of the frame, a pair of grapples pivoted to the links and including sleeves for receiving the rods, one sleeve being above the other, a washer between the sleeve, an oblong collar on the rod, and having oppositely disposed ears, a bracket depending from the top of the frame and pivoted to one of the ears, a link pivoted to the other ear of the collars, and means for pulling upwardly on the last mentioned link to raise the collar and release the sleeve from binding engagement with the rod.

In testimony whereof I affix my signature.

THOMAS A. WILLIAMSEN.